United States Patent [19]

Davis

[11] Patent Number: 4,796,839

[45] Date of Patent: Jan. 10, 1989

[54] SPACE LAUNCH VEHICLE

[76] Inventor: Hubert P. Davis, Star Rte. 2, Box 298K, Canyon Lake, Tex. 78130

[21] Appl. No.: 1,804

[22] Filed: Jan. 8, 1987

[51] Int. Cl.$^4$ .......................... B64G 1/40; B64G 1/62
[52] U.S. Cl. ................................ 244/158 R; 244/160; 244/172
[58] Field of Search .................. 244/158 R, 160, 162, 244/172

[56] References Cited

U.S. PATENT DOCUMENTS

| D. 201,773 | 7/1965 | Webb | 244/160 |
|---|---|---|---|
| 3,202,381 | 8/1965 | Wuenscher | 244/172 |
| 3,295,790 | 1/1967 | Webb | 244/160 |
| 3,369,771 | 2/1968 | Walley et al. | 244/162 |
| 3,672,606 | 6/1972 | Walley | 244/162 |
| 3,702,688 | 11/1972 | Faget | 244/155 |
| 4,265,416 | 5/1981 | Jackson et al. | 244/2 |
| 4,451,017 | 5/1984 | Marshall | 244/172 |

OTHER PUBLICATIONS

M. S. Malkin, Astronautics & Aeronautics, "Space Shuttle/The New Baseline", Jan. 1974.
R. Salkeld, Astronautics & Aeronautics, "Single-Stage Shuttles", Mar. 1974.
T. W. Smith, Aircraft Engineering, "An Approach to Economic Space Transportation", Jun. 1966.

Primary Examiner—Galen Barefoot
Assistant Examiner—Rodney Corl
Attorney, Agent, or Firm—Dula, Shields & Egbert

[57] ABSTRACT

A rocket launch vehicle comprising a rocket body having a forward section and an aft section, a first rocket engine fixedly mounted to the aft section of the rocket body and axially aligned with the rocket body, a second rocket engine detachably mounted to the aft section of the rocket body and aligned axially parallel with the first rocket engine, a third rocket engine detachably mounted to the aft section of the rocket body and aligned axially parallel with the first rocket engine and being on the side of the first rocket engine opposite the second rocket engine, a first recovery structure fastened to the second rocket engine, a second recovery structure attached to the third rocket engine, and a plurality of propellant supply tanks connected to the first, second, and third rocket engines. Each of the rocket engines is a Space Shuttle main engine. The propellant tanks are detachably mounted to the exterior of the rocket body. Fuel tanks are affixed to the interior of the aft section of the rocket body and communicate with the first rocket engine. The recovery structure includes a parachute deployment arrangement for selective deployment of a parachute within a reentry vehicle fixedly attached to each of the second and third rocket engines. The forward section of the rocket body is a modified Titan 4 payload fairing.

3 Claims, 6 Drawing Sheets

SPACE LAUNCH VEHICLE

TECHNICAL FIELD

The present invention relates to an aerospace vehicle for bearing substantial payloads beyond the Earth's atmosphere. More particularly, the present invention relates to an aerospace vehicle that has reusable engines that can be safely returned to Earth. The present invention also contemplates particular methods of operations of such space vehicles.

BACKGROUND ART

The space age is barely two decades old, but the steps taken during that time have created unparalleled opportunities for the exploration and use of outer space. The Space Shuttle has been a step which has greatly facilitated this opportunity.

The Space Shuttle is a versatile vehicle having the essential characteristics of a spacecraft; yet is, in some respects, similar to an aircraft. The Shuttle ascends into outer space with the assistance of rockets just as do conventional spacecraft and descends from outer space, in a manner reminiscent of the landing of an aircraft, by gliding through the atmosphere and landing on a runway. The development of the Shuttle is a significant achievement because it marks the advent of a rudimentary space transportation system. This system allows man and cargo to "shuttle" routinely to and from outer space, thereby making it possible to service, repair and resupply spacecraft, to build larger structures, such as industries, and eventually to construct settlements in outer space.

In a technical sense, the Space Shuttle is made up of an orbiter, an external tank containing the ascent propellant used by the orbiter's main engines (SSME's) and two solid rocket boosters. The orbiter and the solid rocket boosters are reusable, while the external tank is expendable on each launch. At launch, the two solid rockets and the orbiter's three liquid rocket engines ignite and burn simultaneously. The orbiter, with its crew and payload, remains in orbit to carry out a mission, normally for about seven days, When the mission is completed, the orbiter returns to Earth and lands in a fashion similar to an airplane.

While the Space Shuttle marks a major step forward in the development of outer space, a number of problems prevent the Space Shuttle from being the most effective, economical, and efficient method of conveying materials to outer space. In particular, the National Space Transportation System (NSTS) has been at a virtual standstill since the Shuttle Challenger accident of Jan. 28, 1986. Since the Shuttle accident, there has been a goal of finding a cost-effective path to restore the launch capability which was earlier planned by NASA to be provided by twenty-four (24) flights per year of the four (4) Space Shuttle orbiter vehicles. At the present time, more cautious and more realistic estimates by NASA are that the three remaining Shuttle orbiters, when restored to flight status in 1988, can provide about eight (8) launches per year. When OV-105, the replacement Shuttle orbiter, is delivered in 1991 or 1992, the maximum launch capability is now expected to be about fourteen (14) flights per year, less than 60% of 1985 expectations.

The United States Air Force has previously initiated development of a new version of the Titan expendable launch vehicle, the Titan 4, to conduct one or two flights per year for five (5) years for essential national security missions as a back-up to the Shuttle, previously designated as the nation's only large space launch vehicle. Since the accident, another thirteen (13) Titan 4's have been placed on order to fulfill some of the military needs which were assigned to the Shuttle.

The premier new program of NASA is the low Earth-orbit Space Station, planned to be placed in space in the early 1990's and continuously manned thereafter. Current plans are that twelve (12) to over thirty (30) NSTS flights will be required to build the Space Station in orbit from a number of Shuttle-sized payloads and that a minimum of four (4) flights per year thereafter will be required to provide for Space Station crew rotation and logistics resupply.

Many science and commercial payloads will have to seek other means of attaining orbit, as the two large U.S. systems—Titan 4 and Shuttle—are saturated for the indefinite future. Other launch vehicles, notably the French "Ariane" may fill the breach for the small and medium space payloads, but the prospective availability and pricing structure of the Shuttle has greatly impacted many users' plans for satellite scale -- dimensions of 15 feet diameter and 60 feet length and mass up to 65,000 pounds have, over the past ten years, become a de facto standard.

It is necessary to develop a means of fulfilling the initial Shuttle promise—adequate capacity for all users with the capability of placing payloads into space of up to 65,000 pounds and 15 feet by 60 feet in size. In addition, it is necessary to find a means of placing into orbit the brand new "Centaur" upper stage vehicle for planetary exploration. Since one aftermath of the Challenger accident was increased awareness of the hazardous nature of a large, cryogenic propellant vehicle, all plans to fly the "Centaur" vehicle in the manned Shuttle vehicle have been cancelled.

It is an object of the present invention to provide a space launch vehicle that is capable of allowing the recovery of most of the expensive components of launches.

It is another object of the present invention to provide a space launch vehicle that does not require the use of solid rocket boosters to achieve orbit.

It is another object of the present invention to provide a space launch vehicle that utilizes SSME's for liftoff and, thereby, adds to the experience base of the SSME's so as to enhance the maturation of the Space Shuttle.

It is another object of the present invention to provide a launching method that allows cargo to be transported into outer space with a minimum of expense related to the development of new technology.

It is another object of the present invention to provide a space launch vehicle and method of launching that can enable the use of high energy cryogenic propellant upper stages for planetary exploration.

It is still a further object of the present invention to provide a space launch vehicle whose upper stage remains in space for future constructive use.

These and other objects and advantages of the present invention will become apparent from a reading of the attached specifications and appended claims.

DISCLOSURE OF THE INVENTION

The present invention is a space launch vehicle that comprises a rocket body having a forward section and an aft section, a first rocket engine, a second rocket engine, a third rocket engine, a recovery structure fastened to the second and third rocket engines, and propellant tanks. The first rocket engine is fixedly mounted to the aft section of the rocket body and axially aligned with the rocket body. The second rocket engine is detachably mounted to the aft section of the rocket body and is aligned axially parallel with the first rocket engine. The third rocket engine is detachably mounted to the aft section of the rocket body and is aligned axially parallel with the first rocket engine. The third rocket engine is on the side of the first rocket engine opposite the second rocket engine. Separate recovery structures are fastened to the second rocket engine and the third rocket engine. This recovery structure permits the controlled descent of the second and third rocket engines when detached from the rocket body. The propellant tanks are connected to the first, second, and third rocket engines for supplying these engines with propellant fuel.

The first, second, and third rocket engines are all Space Shuttle main engines (SSME's). The propellant tanks are detachably mounted to the exterior of the rocket body and pass propellant to the first, second, and third rocket engines. A structural ring is releasably mounted to the exterior of the rocket body and serves to receive and connect the propellant tanks. The propellant tanks include a plurality of liquid hydrogen tanks and a plurality of liquid oxygen tanks.

The first rocket engine comprises a Space Shuttle Main Engine and a pair of fuel tanks that are affixed to the interior of the aft section of the rocket body. These fuel tanks controllably communicate with the first rocket engine so as to pass propellant to the first rocket engine. In particular, these tanks include a liquid hydrogen tank affixed to the lower portion of the rocket body and positioned so as to be generally adjacent to the first rocket engine. These fuel tanks also include a liquid oxygen tank that is affixed to the upper portion of the interior of the rocket body.

The recovery structures attached to the second and third rocket engines include a first reentry vehicle that is fixedly attached to each of the second and third rocket engines, and a primary parachute deployment arrangement that is mounted to the reentry vehicle so as to selectively permit deployment of a parachute. A secondary parachute deployment arrangement is similarly applied to the reentry vehicles connected to the second and third rocket engines. The secondary parachute deployment system is arranged so as to allow for the deployment of a parachute in the event of failure of the primary parachute deployment system.

The forward section of the rocket body is a Titan 4 payload fairing.

The present invention is also a method of launching this rocket vehicle. This method of launching comprises the following steps: (1) igniting the first, second, and third rocket engines; (2) passing propellant to the rocket engines from the demountably attached propellant tanks until the rocket vehicle achieves a desired altitude; (3) stopping the propellant flow between the propellant tanks and the second and third rocket engines so as to shut down the second and third rocket engines; (4) detaching each of the second and third rocket engines from the rocket vehicle such that these second and third rocket engines drop from the rocket vehicle; (5) demounting the plurality of propellant tanks from the exterior of the rocket vehicle such that these propellant tanks drop from the rocket vehicle; and (6) passing propellant fuel from the fuel tanks interior of the rocket body to the first rocket engine so as to allow the rocket vehicle to achieve orbit.

The step of detaching the second and third rocket engines comprises the step of securing the detached engines within a reentry vehicle having a parachute deployment section. This further includes the step of deploying a parachute from the parachute deployment section of the reentry vehicle when the detached rocket engine decelerates to subsonic velocity. Additional steps include steering the deployed parachute from the reentry vehicle from a location remote from the reentry vehicle and landing the reentry vehicle and the detached rocket engine at the desired location on the face of the Earth.

At orbit, the present method includes the steps of jettisoning the payload fairing from the rocket vehicle when the rocket vehicle approaches orbit and the step of shutting down the first rocket engine when the rocket vehicle achieves insertion orbit.

To achieve interplanetary flight, the present invention includes the steps of: (1) adding insulating blankets to the rocket vehicle; (2) providing a new quantity of propellant fuel; (3) attaching a new payload to the vehicle in orbit; (4) reloading the guidance program; (5) reigniting the first rocket engine; and (6) passing propellant from the fuel tanks interior of the rocket body to the first rocket engine so as enable the rocket vehicle to escape Earth's orbit.

BRIEF DESCRIPTION OF THE DRAWINGS

FIGS. 5 A-D show the method of parachute deployment as used in the method of the present invention.

BEST MODE FOR CARRYING OUT THE INVENTION

Figure 1:
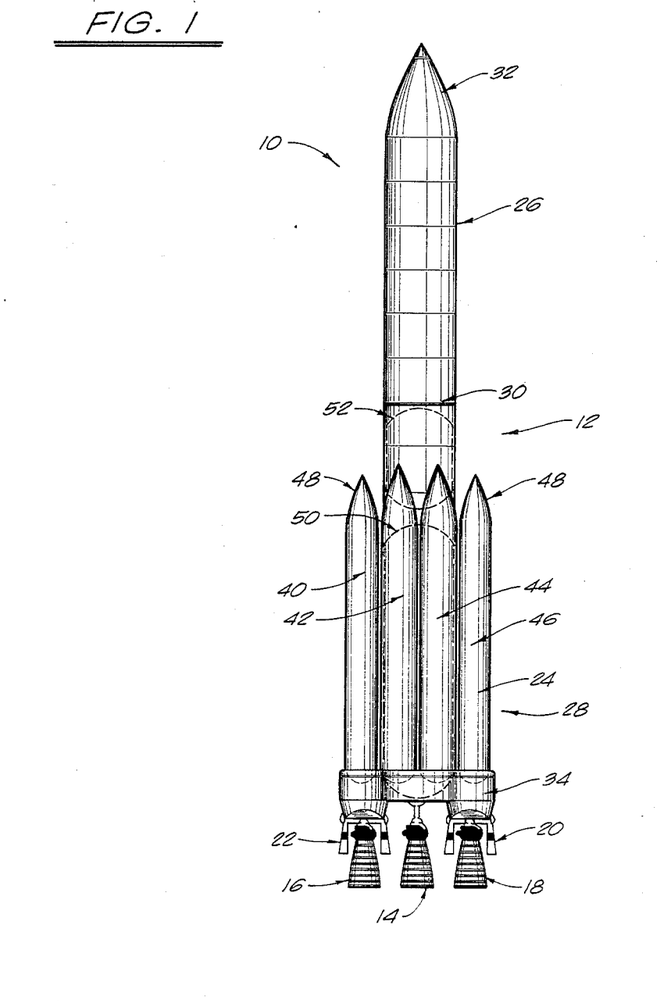
FIG. 1 is a view in side elevation of the space launch vehicle in accordance with the preferred embodiment of the present invention.

Referring to FIG. 1, there is shown at 10 the space launch vehicle in accordance with the preferred embodiment of the present invention. As can be seen in FIG. 1, space launch vehicle 10 includes rocket body 12, first rocket engine 14, second rocket engine 16, third rocket engine 18, recovery structures 20 and 22, and propulsion means 24.

Rocket body 10 has a forward section 26 and an aft section 28. In essence, the rocket body 12 is a new structure of the same diameter as the Titan 4 payload fairing. Forward section 26 is a modified Titan 4 payload fairing. Cargo, and other payloads, are transported into orbit by containment within forward section 26. Forward section 26, carrying the payload, will eventually separate from the aft section 28 at junction 30. As can be seen, forward section 26 has an aerodynamic nose cone 32. The payload fairing 26 of rocket body 10 should have a capacity of supporting a mass of up to 65,000 pounds and have interior dimensions of 15 feet diameter by 60 feet in length. These dimensions will allow the space vehicle 10 of the present invention to serve as a means of fulfilling the Shuttle promise. It offers adequate capacity for all users by placing Shuttle-sized payloads into space.

It should be noted that if Space Station or other requirements dictate a larger diametrical envelope, then new payload fairings 26 of up to 27.5 feet in diameter may be fitted to the space vehicle 10 of the present invention. If National Space Transportation System-style longeron mounting of payloads is required, these support elements may be provided from the payload mass.

The first rocket engine 14, the second rocket engine 16 and the third rocket engine 18 are standard Space Shuttle main engines (SSME's). These engines are the primary propulsion for the Space Shuttle. When used in the Space Shuttle, these types of engines are mounted in the orbiter aft fuselage. The Space Shuttle main engine was originally developed by Rocketdyne Division of Rockwell International as a reusable high-performance liquid-propellant variable-thrust engine—delivering sea-level thrust of 375,000 pounds at a chamber pressure of 2,970 psia. Although similar to the engines used in the Apollo and other space programs (F-20), the SSME makes use of advanced high-pressure technology and some innovative design features. These include the use of hydrogen fuel to cool all combustion devices directly exposed to contact with high-temperature combustion products and electronic engine controller which automatically performs check-out, start, main stage, and engine shutdown, and internal inspection ports in critical components for ease of maintenance. It is estimated that each Space Shuttle main engine costs between $40 and $50 million.

The present invention employs the SSME's as engines 14, 16, and 18 since the technology for manufacturing the engines and the reliability of operation have already been established. The configuration of the present invention eliminates the expense of redesigning, retesting, retooling, and reproducing the engines.

As used herein, first engine 14 is fixedly mounted to the aft section 28 of rocket body 12. The longitudinal axis of the first engine 14 is axially aligned with the rocket body 12. First rocket engine 14 remains with the launch vehicle 10 through the orbital phase.

Second rocket engine 16 is detachably mounted to the aft section 28 of rocket body 12. Engine 16 is aligned so as to be axially parallel with the first rocket engine 14.

Third rocket engine 18 is detachably mounted to the aft section 28 of the rocket body 12. This third rocket engine 18 is aligned axially parallel with the first rocket engine 14. This third rocket engine is located 180 degrees on the other side of the first rocket engine 14 from the second rocket engine 16. As can be seen, the recovery structures 20 and 22 are identical for third engine 18 and second engine 16, respectively. As can be seen, the recovery structures 20 and 22 are structurally mounted to the base ring 34.

Propulsion means 24 includes propellant tanks 40, 42, 44, and 46. These propellant tanks are detachably mounted to the exterior of the aft section 28 of rocket body 12. Each of the tanks 40, 42, 44, and 46 are attached to base ring 34. Propellant tanks 40, 42, 44, and 46 include aerodynamic nose sections 48. Tanks 40, 42, 44, and 46 are attached to the exterior of the rocket body 12 such that the longitudinal axis of these tanks is parallel to the longitudinal axis of the rocket body.

Tanks 40 and 46 comprise liquid oxygen tanks. These liquid oxygen tanks have a capacity of roughly one hundred tons each. There are four liquid hydrogen tanks, two of which are indicated as 42 and 44 (the remaining two liquid hydrogen tanks are obscured from view). These liquid hydrogen tanks have a capacity of roughly nine tons each. Each of the tanks 40, 42, 44, and 46, and the obscured liquid hydrogen tanks are in fluid and valved communication with the engines 14, 16, and 18. These tanks serve to supply engines 14, 16, and 18 with propellant during the liftoff and initial stages of flight.

As will be discussed hereinafter, first engine 14 provides thrust in higher altitudes of flight. First engine 14 is in valved and fluid communication with fuel tanks 50 and 52 affixed to the interior of the aft section 28 of rocket body 12. Fuel tank 50 is a liquid hydrogen tank that is affixed to the lower portion of the aft section 28 of the rocket body and is positioned generally adjacent to the first engine 14. This liquid hydrogen tank has a capacity of roughly twenty-five tons. Fuel tank 52 is a liquid oxygen tank that is affixed to the upper portion of the aft section of the rocket body. This liquid oxygen tank 52 has a capacity of roughly one hundred and fifty tons. Tanks 50 and 52 are affixed to the aft section 28 of rocket body 12 as part of the core stage of the launch vehicle 10.

Figure 2:
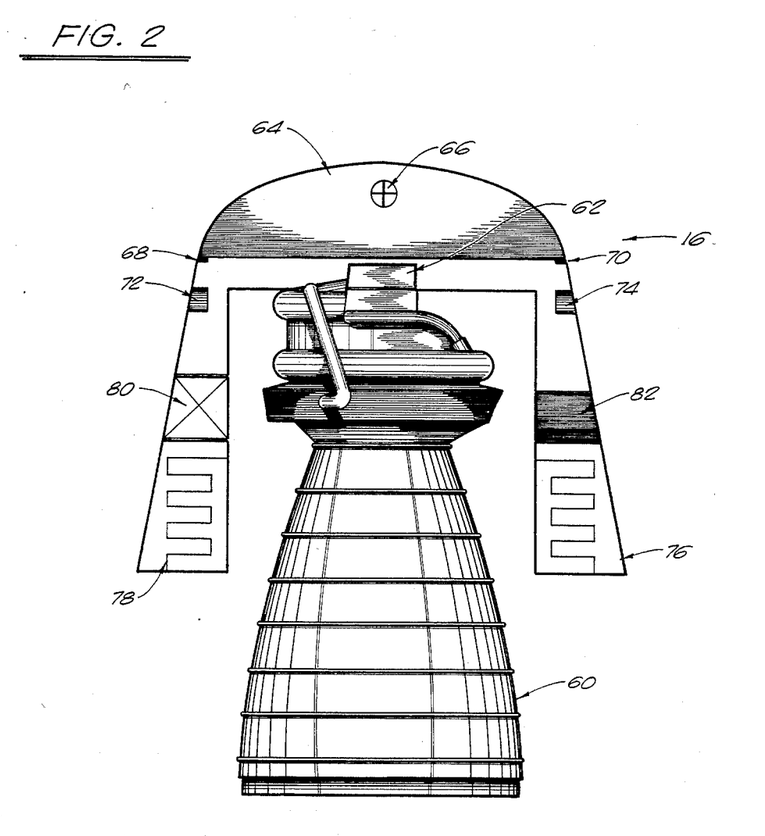
FIG. 2 is a close up view, in side elevation, of a detached rocket engine and associated recovery structure.
Figure 3:
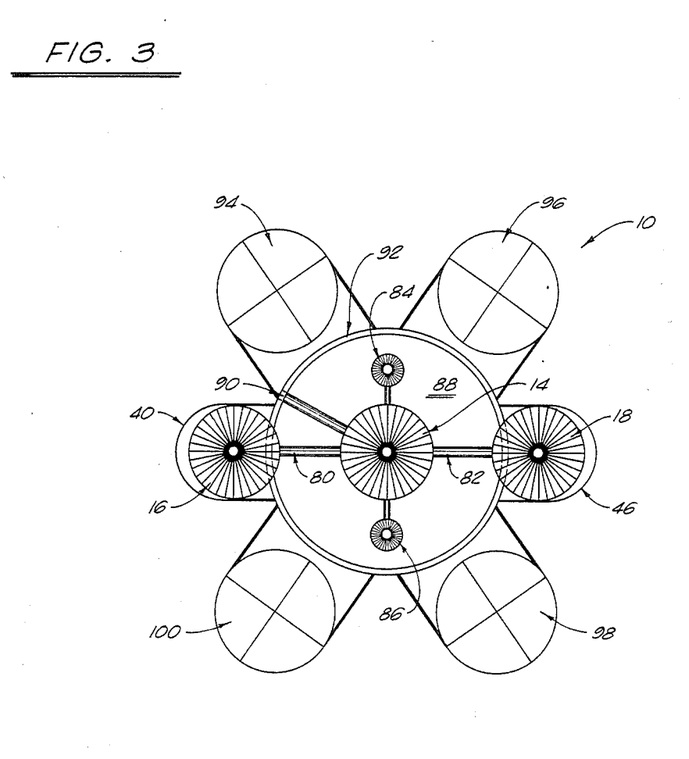
FIG. 3 is a bottom view of the space launch vehicle of FIGURE 1.

Referring to FIG. 2, there is shown a close-up view of detachable engines 16 or 18. As can be seen in FIG. 2, Space Shuttle main engine 60 is fixedly mounted at 62 to the recovery structure 64. Recovery structure 64 serves as a shields for protecting the expensive SSME 60 during descent. Recovery structure 64 and SSME 60 are mounted to launch vehicle 10 by gimbal 66. Gimbal 66 may permit the engine 60 to be manipulated during flight to control pitch, yaw and roll. It should be noted, however, that it may be possible to have a fixed thrust vector for simplicity of construction and use. The recovery structure 64 is more rigidly attached to the launch vehicle 10 at structural attachment points 68 and 70. Fuel is fed to engine 60 through the oxygen port 72 and the hydrogen port 74. The primary parachute is contained in deployment section 76. An auxiliary, or backup, parachute is contained in secondary parachute deployment section 78. The avionics for the system are contained in section 80. Power is supplied by battery at 82. When it become necessary to shut off fuel to engine 60, oxygen port 72 and hydrogen port 74 serve to close the valves and to disconnect the engine from the fuel supplies. FIG. 3 is a bottom view of the launch vehicle 10 of FIG. 1.

FIG. 3 shows the exhaust nozzles of engines 14, 16, and 18. Liquid oxygen tanks 40 and 46 are shown as extending from above the exhaust nozzles of engines 14, 16 and 18. The propellant is fed to the engine 14 by lines 80 and 82. RL-10 engines 84 and 86 are also utilized by the second stage 88 of launch vehicle 10 for controlling roll during flight. A liquid oxygen duct 90 extends from first engine 14 to the exterior 92 of aft section 28 of rocket body 12. The liquid hydrogen tanks 94, 96, 98, and 100 extend outwardly from the exterior 92 of stage 88.

Figure 4:
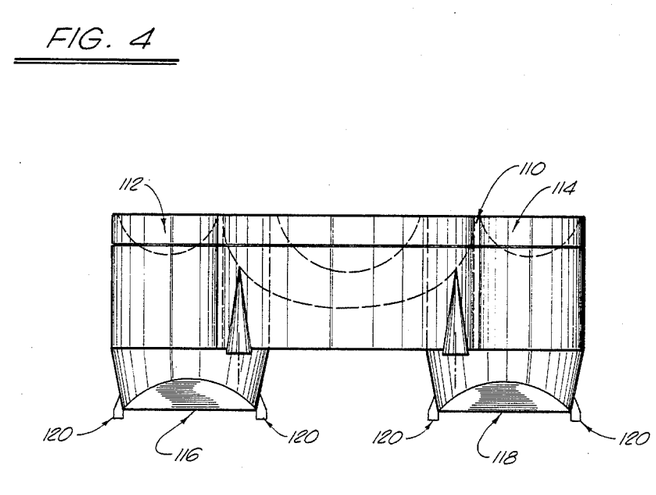
FIG. 4 is a close up view showing the base ring for the support of the fuel tanks.

FIG. 4 shows the base ring 34 in greater detail. Base ring 34 is demountably attached about the exterior 110 of the rocket body 12. This base ring 34 accommodates, receives, and structurally maintains the propellant tanks 112 and 114 in position. The detachable engines 16 and 18 are mounted to base ring 34 at receiving areas 116 and 118, respectively. The capture latches 120 retain the recovery structure in proper position.

The operation of the present invention and method of launching are described hereinafter.

Initially, the forward section 26 of launch vehicle 10 is delivered by the supplier and prepared for flight in the low bay area of the vehicle assembly building at the Kennedy Space Center. The aft section 28 has strap-on tanks 24, structural ring 34, recovery structures 20 and 22, and engines 14, 16 and 18 assembled in another bay of the vehicle assembly building by the contractor crew. These are checked out and presented to the government for acceptance on Form DD250. The Kennedy Space Center crew then assembles and performs checkout on the integrated launch vehicle 10, less the payload. It is then moved by a transport vehicle to the launch facility, such as a modified, prepositioned standard STS MLP on Complex 39 A or B. A crane then places the vehicle on special supports over the Space Shuttle main engine exhaust duct of the MLP and servicing connections are attached. The separately-processed payload and the payload fairing 26 are then mated to the erected vehicle and FRT's performed. At T-2 days, propellants are loaded into the tanks 24 and final checks performed. The LCC and MCC crews then perform the launch.

In the preferred embodiment, it is believed that liftoff of the launch vehicle 10 occurs at a thrust-to-weight ratio of about 1.20 and the vehicle ascends to about 165,000 feet altitude and 5,500 feet per second velocity in about 154 seconds, having passed through maximum dynamic pressure of less than 600 p.s.i. at about 80 seconds. The outboard engines 16 and 18 are then shut down and valves to them and from the propellant tanks are closed. The central affixed engine 14 begins drawing propellant from the fuel tanks 50 and 52 fixed to the interior of the vehicle body 12. The detachable engines 16 and 18 are then secured within the reentry vehicles 20 and 22 and separated. The structural base ring 34 and the six strap-on tanks (40, 46, 94, 96, 98, and 100, as shown in FIG. 3) are then released to move aft along rails and separate from the vehicle body 12.

As the second stages continues flight to about 210 seconds and 265,000 feet, the dynamic pressure falls below 1 p.s.f. and the payload fairing 26 is jettisoned. At about 410 seconds, MECO occurs at an insertion orbit of about 60×160NM and the phase of the flight powered by engine 14 ends. OMS burns are then performed to attain the desired 160NM circular orbit. The payload is then enabled and separated and the stage is parked in orbit or docked to a pre-placed assembly for orbital storage.

Figures 5A, 5B, 5C, 5D:
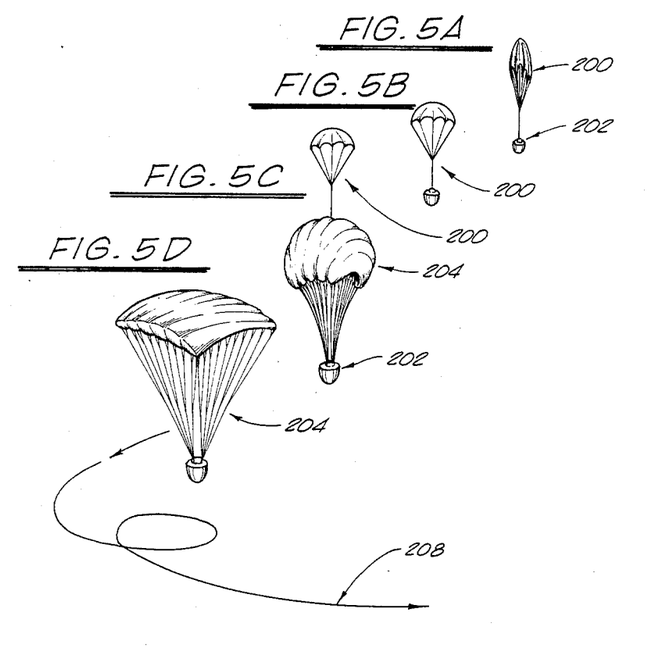
Figure 6:
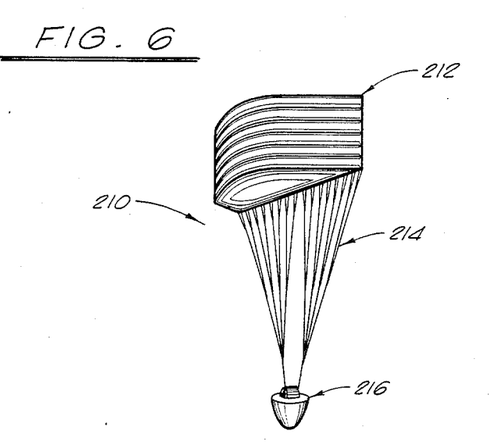
FIG. 6 shows the configuration of the parachute transporting the rocket engine.

Following separation at about T+154 seconds, the two reentry vehicles 20 and 22 containing the engines 16 and 18 being to decelerate. As shown in FIG. 5A, at about 70 seconds later, flight velocity becomes subsonic and drogue parachute 200 is deployed in the reefed condition.

It should be noted that the present invention is not intended to be limited by the above-detailed description of liftoff. These are rough estimates of the operation of the space launch vehicle of the present invention.

As shown in FIG. 5A, the reentry vehicle 202 is attached by lines to the drogue parachute 200. FIG. 5B shows the drogue parachute 200 in its expanded condition. Eventually, drogue parachute 200 will cause the main parachute 204 to be released from the main parachute deployment section 76 of the recovery structure 64 (or reentry vehicle 64). Engine 202 continues to remain attached to the parachute structure. In FIG. 5D, the main parachute 204 is shown in its expanded condition. Path 208 illustrates the flight path that the parachute/reentry vehicle follows for a desired landing. Each reentry vehicle 20 or 22 is equipped with dual main parachutes similar to modern sport parachutes which are deployed sequentially. If the first parachute deploys satisfactorily, the second is not deployed.

Steering commands are issued from an electronic package homing device from an area remote from the parachute/reentry vehicle. The steering commands allow the parachute to follow the path 208 illustrated in FIG. 5D.

FIG. 5D shows the configuration of the parachute used to bring the SSME's to Earth. In particular, parachute 210 has canopy 212 at the top, suspension lines 214 attached to and extending from canopy 212 and the reentry vehicle 216. This is a type of parachute known as the RamAir Inflated Dual Membrane Gliding Parachute. As illustrated in FIG. 2, the recovery vehicle 216 includes suitable avionics for controlling the attached parachute. Control of this configuration is simplistic yet highly effective. Right side deflection produces a right turn, the opposite a left turn, and both edges deflected cause a breaking effect. Rapidly applying breaking results in dynamic flairout.

Surface deflection for control is accomplished by control lines 214 attached to the outboard trailing edges of the canopy 212 extending downward to driven pulleys in the avionics section 80 of the recovery vehicle. All applications developed thus far employ battery-powered electric drives collectively packaged along with the RM receiver and control logic components. This system is known as the "Para-Point" system and is known in the prior art. Current "Para Point" systems operate on a RF frequency of 360.4 MHz, employ up to 2.0 watts of power and have a maximum slant range of over 30 miles up to 40,000 feet. The frequency, range, and power output are adjustable to suit specific application needs and the command link amenable to preventive measures against unfriendly tampering and interdiction.

Figure 7:
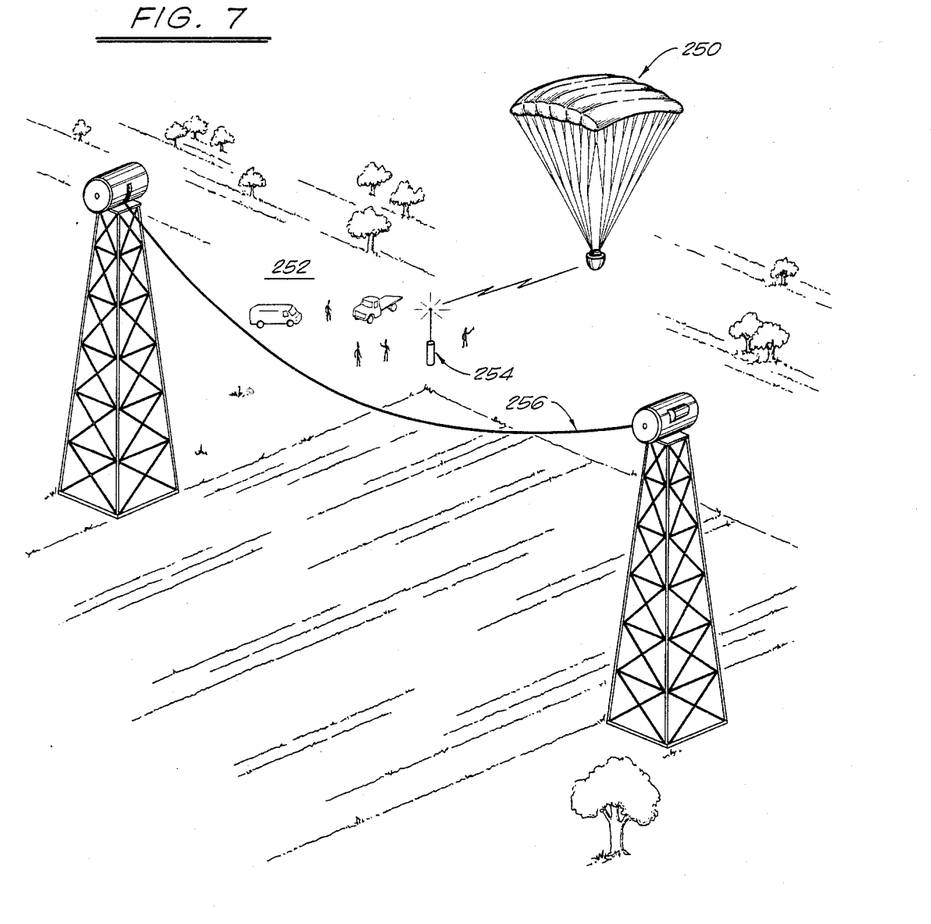
FIG. 7 is prospective view showing a landing and recovery system for receiving the rocket engine after detachment and deployment from the space vehicle.

As shown in FIG. 7, when the parachute 250 is visually sighted, manual control from the ground 252 is assumed. As shown in FIGURE 7, a remote control radio transmitter 254 is employed to properly steer the parachute/reentry vehicle 250. Once manual control is assumed, the parachute is guided and directed so as to engage arresting gear 256 so as to achieve a dry, low-impact recovery. The arrsting gear 256 is of the type known in aircraft carrier technology. The line 256 is raised on towers to preclude all land or sea surface contact.

It should be noted that the arresting gear can, and preferably should, be employed on the deck of large deck vessel stationed at the point-of-impact. Ship-mounted arresting gear can allow the launch phase of the launch vehicle 10 to occur over water. This can serve to permit use of present launch facilities in Florida and California.

Once the parachute is received by the arresting gear 256, the engines 16 and 18 are safed. These engines 16 and 18 are then removed from their respective reentry vehicle bodies 22 and 20 and stored in shipping containers for return to the government at Port Canaveral.

There are various modifications in the present invention that can be made so as to enhance the ability of the present invention in the future. Advanced versions of this vehicle utilizes the rocket body of the present invention with either two or four new larger hydrocarbon/oxygen (HC/O$_2$) gas generator engines. These replace the outboard SSME's and require a new set of six (6) strap-on tanks. These additional tanks provide RP-1 or propane in addition to hydrogen and oxygen. A different size of recovery structure and structural ring would be required to support the heavier loads imposed by the additional tanks and different engines. In these embodiments, a two-position nozzle would be fitted to the central SSME (as opposed to the single position nozzle of the preferred embodiment) to enhance altitude performance. In these alternative embodiment, a 27.5 foot diameter payload fairing is incorporated. These alternative embodiment vehicles could provide a payload to low-Earth orbit of well over 100,000 lbm. and 150,000 lbm for the two and four HC/O$_2$ engine versions, respectively, and cause minimum perturbations of activities at KSC, VAFB, JSC and MSFC to attain this growth with their introduction.

All three of the embodiments of the present invention may be used with the Centaur G' upper stage to provide a new plateau of capability for high energy missions, including geo-stationary placement of large communications and observation platforms and to support the renewal of ambitious, unmanned exploration missions of the solar system.

As the present Shuttle orbiters approach end-of-life, one of the options for their replacement is to develop a new manned vehicle carrying fifteen to twenty passengers as a payload for the abovedescribed launch vehicle. This could be accomplished with an alternative embodiment of the present invention by its ability to carry greater payloads, up to 150,000 lbm.

As the need for mobility in space increases, the second stage of the alternative embodiment of the present invention can be converted at the LEO Space Station into a powerful orbit transfer vehicle, providing the capability to begin lunar based placement, manned Mars missions, SDI placement, manned GEO servicing and other ambitious space activities.

The present invention offers a great improvement over present means for transporting cargo into orbit. The use of the standard SSME's would provide sufficient power to push the payload into orbit. Since the SSME's are of a standard design, it could become possible to produce these additional SSME's at lower costs and greater standardization for both this vehicle and the Space Shuttle. An additional advantage of the present invention is that the most expensive aspects of each lauch are recovered by the return of the SSME's to Earth. The SSME's can then be refitted and reused in future missions. Since a remaining SSME is affixed to the rocket body in orbit, it becomes possible to begin interplanetary transport from orbit. In outer space, an amount of fuel, in combination with the SSME, can provide great transport capabilities. Once in orbit, the propellant tanks could be refilled, the remaining SSME reignited, and the space launch vehicle would be of a suitable condition for interplanetary travel. It should be noted that the ultimate cost for transportation, once in outer space, is small as compared with the cost of launching a payload from the surface of the Earth.

The foregoing disclosure and description of the invention is illustrative and explanatory thereof. Various changes in the method of launching steps as well as in the details of the illustrated launch vehicle, may be made within the scope of the appended claims without departing from the true spirit of the invention. This invention should only be limited by the following claims, and their legal equivalents.

I claim:

1. A method of launching a rocket vehicle having one fixedly mounted rocket engine and two detachable mounted rocket engines affixed to a structural base member, having a plurality of propellant tanks demountably fastened to the exterior of said rocket vehicle forward of said structural base member, having fuel tanks fixed to the interior of said rocket vehicle, and having a payload fairing in the forward portion of said rocket vehicle, said method of launching comprising the steps of:

igniting said fixedly mounted rocket engine and said detachably mounted rocket engines;

passing propellant to said engines from said plurality of propellant tanks until said rocket vehicle achieves a desired altitude;

stopping the passage of propellant between said propellant tanks and said two detachably mounted rocket engines such that said detachably mounted rocket engines are shut down;

detaching first each of said detachably mounted rocket engines from said rocket vehicle such that each of said detachably mounted rocket engines drop from said rocket vehicle, said step of detaching further comprising:

securing the detached rocket engines within a reentry vehicle, said reentry vehicle being a structural member having atmospheric shielding capabilities for protection of said rocket engine, said reentry vehicle having a parachute deployment section arranged therein;

demounting second said plurality of propellant tanks from the exterior of said rocket vehicle such that said plurality of propellant tanks drop from said rocket vehicle; and passing propellant from said fuel tanks to said fixedly mounted rocket engine, said propellant from said fuel tanks sufficient to allow said rocket vehicle to achieve an orbit.

2. The method of launching of claim 1, further comprising the steps of:

deploying a parachute from said parachute deployment section of said reentry vehicle when the detached rocket engine decelerates to subsonic velocity.

3. The method of launching of claim 2, further comprising the steps of:

steering the deployed parachute from said reentry vehicle from a location remote from said reentry vehicle; and landing said reentry vehicle and said detached rocket engine at a desired location on the surface of the Earth.

* * * * *